(12) United States Patent
Klockar et al.

(10) Patent No.: US 9,485,744 B2
(45) Date of Patent: Nov. 1, 2016

(54) COMMUNICATION NETWORK NODES AND METHODS PERFORMED THEREIN

(71) Applicant: Telefonaktiebolaget L M Ericsson (PUBL), Stockholm (SE)

(72) Inventors: Lars Klockar, Rättvik (SE); Mats Forsman, Rönninge (SE); Lars Peter Pehrson, Sollentuna (SE); Tomas Thyni, Järfälla (SE); Annikki Welin, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 14/406,732

(22) PCT Filed: Sep. 4, 2014

(86) PCT No.: PCT/SE2014/051019
§ 371 (c)(1),
(2) Date: Dec. 9, 2014

(87) PCT Pub. No.: WO2016/036291
PCT Pub. Date: Mar. 10, 2016

(65) Prior Publication Data
US 2016/0073365 A1    Mar. 10, 2016

(51) Int. Cl.
*H04J 3/06* (2006.01)
*H04W 56/00* (2009.01)
*H04W 84/04* (2009.01)

(52) U.S. Cl.
CPC .......... *H04W 56/001* (2013.01); *H04J 3/0667* (2013.01); *H04W 56/0035* (2013.01); *H04W 84/042* (2013.01)

(58) Field of Classification Search
None
See application file for complete search history.

(56) References Cited

U.S. PATENT DOCUMENTS 8,718,482 B1    5/2014    Roberts et al.
8,819,161 B1 *  8/2014    Pannell ................ H04J 3/0697
                                                         709/208
(Continued)

FOREIGN PATENT DOCUMENTS

EP    2595331 A2    5/2013

OTHER PUBLICATIONS

International Search Report and the Written Opinion of the International Searching Authority dated Feb. 26, 2015, in International Application No. PCT/SE2014/051019, 11 pages.
(Continued)

*Primary Examiner* — Anh-Vu Ly
(74) *Attorney, Agent, or Firm* — Rothwell, Figg, Ernst & Manbeck, P.C.

(57) ABSTRACT

Determining a time synchronization inaccuracy value between a first node and a second node. A PTP packet is received including Node IDs representing respective transport nodes along a first path, and from the second node Node IDs are obtained representing respective transport nodes along a second path. Furthermore, a first common node of the first path and the second path is determined. The time synchronization inaccuracy value between the first node and the second node is calculated. By including Node IDs in received PTP packets before forwarding them to a node, the node is enabled to determine a first common node. Thereby, the node may calculate relative time inaccuracy values with respect to the other access network nodes, which may be used to decrease inaccuracy time synchronization for co-ordination functions.

29 Claims, 7 Drawing Sheets

(56) References Cited

U.S. PATENT DOCUMENTS

| | | | |
|---|---|---|---|
| 2012/0026041 | A1 | 2/2012 | Murdock et al. |
| 2012/0069836 | A1 | 3/2012 | Tirkkonen et al. |
| 2012/0170631 | A1* | 7/2012 | Liu ............... H04L 43/0864 375/224 |
| 2013/0003757 | A1* | 1/2013 | Boatright ............ H04J 3/0697 370/474 |
| 2013/0010813 | A1* | 1/2013 | Ruffini ................ H04J 3/0697 370/503 |
| 2013/0100832 | A1* | 4/2013 | Flinn ................. H04L 43/0852 370/252 |
| 2013/0155945 | A1* | 6/2013 | Chen ................. H04J 3/0661 370/328 |
| 2013/0215889 | A1* | 8/2013 | Zheng ................ H04J 3/0667 370/390 |
| 2014/0269672 | A1* | 9/2014 | Zampetti ........... H04W 56/0015 370/350 |
| 2014/0286357 | A1* | 9/2014 | Shenoi ................ H04J 3/0688 370/503 |
| 2014/0294021 | A1* | 10/2014 | Jobert .................. H04L 45/00 370/503 |
| 2015/0063375 | A1* | 3/2015 | Tzeng ................. H04J 3/0673 370/512 |
| 2015/0171980 | A1* | 6/2015 | Bui .................... H04L 43/10 370/393 |
| 2015/0215031 | A1* | 7/2015 | Dalvi ............... H04W 56/0015 370/324 |

OTHER PUBLICATIONS

IEEE, IEEE Standard for a Precision Clock Synchronization Protocol for Networked Measurement and Control Systems, IEEE Instrumentation and Measurement Society, IEEE Std 1588, 2008, 289 pages.

ITU-T G.8271.1/Y.1366.1, Amendment 1, Series G: Transmission Systems and Media, Digital Systems and Networks, Packet over Transport aspects—Synchronization, quality and availability targets, Series Y: Global Information Infrastructure, Internet Protocol Aspects and Next-Generation Networks, Network limits for time synchronization in packet networks, International Telecommunication Union, May 2014, 18 pages.

ITU-T G.8271/Y.1366, Series G: Transmission Systems and Media, Digital Systems and Networks, Packet over Transport aspects—Quality and availability targets, Series Y: Global Information Infrastructure, Internet Protocol Aspects and Next-Generation Networks, Internet protocol aspects—Transport, Time and phase synchronization aspects of packet networks, International Telecommunication Union, Feb. 2012, 32 pages.

ITU-T G.8271/Y.1367, Series G: Transmission Systems and Media, Digital Systems and Networks, Packet over Transport aspects—Quality and availability targets, Series Y: Global Information Infrastructure, Internet Protocol Aspects and Next-Generation Networks, Internet protocol aspects—Transport, Timing characteristics of primary reference time clocks, International Telecommunication Union, Oct. 2012, 22 pages.

3GPP, 3rd Generation Partnership Project; Technical Specification Group Radio Access Network; Evolved Universal Terrestrial Radio Access (E-UTRA); Requirements for support of radio resource management (Release 12), 3GPP TS 36.133 V12.5.0, 2014, 877 pages.

3GPP, 3rd Generation Partnership Project; Technical Specification Group Radio Access Network; Evolved Universal Terrestrial Radio Access (E-UTRA); User Equipment (UE) radio transmission and reception(Release 12), 3GPP TS 36.101 V12.5.0, 2014, 536 pages.

International Preliminary Report on Patentability, issued in corresponding International Application No. PCT/SE2014/051019, dated Aug. 2, 2016, 20 pages.

* cited by examiner

Fig. 1 (existing art)

COMMUNICATION NETWORK NODES AND METHODS PERFORMED THEREIN

CROSS REFERENCE TO RELATED APPLICATION(S)

This application is a 35 U.S.C. §371 National Phase Entry Application from PCT/SE2014/051019, filed Sep. 4, 2014, designating the United States, the disclosure of which is incorporated herein in its entirety by reference.

TECHNICAL FIELD

This description relates generally to time or phase synchronisation in communication networks. Particularly, it relates to determination of time or phase synchronisation inaccuracy of access network nodes in packet switched networks.

BACKGROUND

For an increasing amount of services in communication networks, wireless communication devices are communicatively connected to more than one radio base station. For instance, when determining a geographic location of a wireless communication device, reference signals from multiple radio base stations are used.

In communication networks which applies LTE (Long Term Evolution) based radio access technologies, accurate time and phase alignment of the internal clock is important. Time and phase synchronization is required for many LTE coordination features e.g. for joint transmission, a wireless communication device receives data from multiple cells or multiple RBSs (Radio Base Stations), which offers better performance, but puts harder requirements on synchronization. In packet synchronisation networks, a major problem for synchronization protocols is the variance in the send time, access time, propagation time, and the receive time.

From the infrastructure perspective, mobile operators have a broad range of topologies to support. The physical network using different technologies such as microwave, fibre and copper wire will enable/limit different capabilities and characteristics. These differences in physical transport and in the different types of topologies, creates delay and delay variation that is unpredictable.

One solution for synchronising internal clocks in communication network is to distribute PTP (Precision Time Protocol) messages from a Grandmaster entity, which in generally is located centralised in the communication network, to PTP-clients at each cell site. The PTP protocol distributes PTP messages from a Grandmaster entity to transport network nodes and access network nodes who update their internal clocks based on the received time information in order to stay synchronized. A PTP system is a distributed, networked system consisting of a combination of PTP and non-PTP devices. PTP systems include a grandmaster entity, boundary clocks, and transparent clocks. Often the Grandmaster entity is located in a centralized part of the network; causing PTP messages to travel multiple hops. A boundary clock has multiple network connections and can accurately bridge synchronization from one network segment to another. A synchronization master is selected for each of the network segments in the system. The root timing reference is called the Grandmaster clock. The Grandmaster entity transmits synchronization information to the clocks that are in its network segment. The boundary clocks with a presence on that segment then relay accurate time to the other segments to which they are equally connected. The transparent clock modifies PTP messages by including appropriate timestamps as they pass through the device. The Timestamps in the PTP messages are compensated for time spent traversing the network and equipment e.g. (switch/router).

The term "wireless communication device" will be used throughout this description to denote any device which is capable of wireless communications. The term wireless communication device may thus include any device, which may be used by a user for wireless communications. Accordingly, the term wireless communication device may alternatively be referred to as a mobile terminal, a terminal, a user terminal (UT), a user equipment (UE), a wireless terminal, a wireless communication device, a wireless transmit/receive unit (WTRU), a mobile phone, a cell phone, a table computer, a smart phone, etc. Yet further, the term wireless communication device includes MTC (Machine Type Communication) devices, which do not necessarily involve human interaction. MTC devices are sometimes referred to as Machine-to-Machine (M2M) devices.

With reference to FIG. 1, which is a schematic overview, a scenario where a wireless communication device 100 is served by multiple access network nodes 102, 104 will now be described.

In this example the communication network node is communicatively connected via an LTE (Long Term Evolution) access network to a first radio base station 102 and a second radio base station 104. In the figure respective coverage areas of the radio base stations 102, 104 are illustrated as two ovals. The first radio base station 102 is set to be a master for a coordination function such as FeICIC (Further enhanced Inter-Cell Interference Coordination) for a specific wireless communication device, and controls some functionality of the second radio base station 104 which is set to be a slave. When the wireless communication device 100 is connected to multiple radio base stations 102, 104, for some functionality, the radio base stations need to fulfil some time synchronisation requirements. Such time synchronisation requirements are also known as phase synchronisation requirements. For instance, radio base stations could be time synchronised in accordance with the PTP (Precision Time Protocol). A centrally arranged Grandmaster entity distributes PTP packets according to PTP IEEE (Institute of Electrical and Electronics Engineers) 1588v2, end to end, to PTP-clients, e.g. the radio base stations.

In this example the wireless communication device 100 is located in an area between the dash-dotted lines A and B, where the wireless communication device 100 will be served by the radio base stations 102, 104. This area will be centred in the middle between the radio base stations 102, 104. In order for functions to work properly radio base station 104 coverage must at least partly be within the area between the dotted lines A and B. The PTP synchronised signals from the master and slave radio base stations 102, 104 which reach the wireless communication device may not differ more than +/−750 ns from each other, giving a total of 1500 ns, which corresponds to a distance between A and B of about 450 meters. However, due to the time synchronisation requirements, wireless communication devices 100 may be located within coverage of two radio base stations 102, 104 but outside the lines A and B and could therefore not be properly served, which is a problem. A better time synchronization precision in the transport network part would allow for an increased difference between the radio signals from radio base stations 102, 104 to the wireless communication device 100 and thereby an increased distance between the dotted lines A and B. This increased area between dotted lines A and B will then cover further wireless communication devices 100

Thus, there is need for a more effective use of installed communication resources in communication networks.

SUMMARY

It would be desirable to obtain improved performance for co-ordination functions in communication networks. It is an object of this disclosure to address at least any of the issues outlined above.

Further, it is an object to provide one access network node with functionality for determining a relative time synchronisation inaccuracy value between itself and another access node. These objects may be met by a method and an arrangement according to the attached independent claims.

According to one aspect, a method is provided which is performed by a transport network node. The method comprises receiving a PTP (Precision Time Protocol) packet from a grandmaster entity, including a Node ID of the transport network node in the PTP packet, and sending the PTP packet to an access network node. The Node ID is configured for subsequent use by the access network node for determining a time synchronisation inaccuracy between the access network node and a further access network node.

The method may further comprise including a current time inaccuracy value of the transport network node in the PTP packet. Furthermore, the Node IDs and current time inaccuracy values may be included in different data fields of the PTP packets. The PTP packets may be received directly from the grandmaster entity or via one or further transport network nodes.

According to another aspect, a method is provided which is performed by a first access network node for determining a time synchronisation inaccuracy value between a first access network node and a second access network node, the first access network node being communicatively connected to the second access network node. The method comprises receiving a PTP (Precision Time Protocol) packet including Node IDs representing respective transport network nodes along a first path extending between a grandmaster entity and the first access network node, and from the second access network node, obtaining Node IDs representing respective transport network nodes along a second path extending between the grandmaster entity and the second access network node.

Furthermore, the method comprises determining a first common transport network node of the first path and the second path, by comparing received Node IDs of transport network nodes along the first path with obtained Node IDs of transport network nodes along the second path, and calculating the time synchronisation inaccuracy value between the first access network node and the second access network node, based on: the number of transport network nodes of the first path between the first common transport network node and the first access network node; and the number of transport network nodes of the second path between the first common transport network node and the second access network node The calculating is further based on respective time inaccuracy values of: the transport network nodes of the first path between the first common transport network node and the first access network node; and the transport network nodes of the second path between the first common transport network node and the second access network node.

The calculation may comprise adding, subtracting, or performing statistical tolerance stacking of time inaccuracy values of non-common transport network nodes. The time inaccuracy values may be either, pre-set standard time inaccuracy values, or received/obtained time inaccuracy values of the transport network nodes.

According to further aspects, a transport network node and an access network node, which are adapted to perform the method steps of any of the above described respective methods, are also provided. Both the transport network node and the access network node comprise a controller and a communication module arranged therefore.

By including Node IDs in received PTP packets before forwarding them to an access network node, the access network node is enabled to determine a first common transport network node with other access network node. Thereby, the access network node may calculate relative time inaccuracy values between the access network nodes, which may be used to decrease inaccuracy time synchronisation for co-ordination functions.

BRIEF DESCRIPTION OF DRAWINGS

The solution will now be described in more detail by means of exemplary embodiments and with reference to the accompanying drawings, in which.

DETAILED DESCRIPTION

There is a need for a solution which enables network operators to make better use of installed communication resources.

Figure 1:
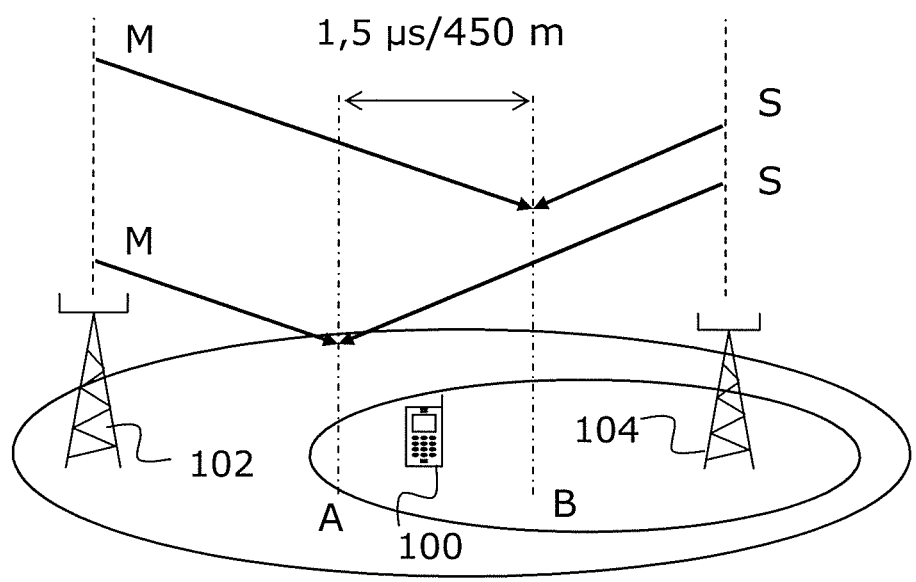
FIG. 1 is a schematic illustration of a situation in accordance with the existing art.

By in transport network nodes providing received PTP packets with the node IDs of the transport network nodes, access network nodes may determine a first common transport network node and determine a time synchronisation between multiple access network nodes which is more accurate according to the appropriate situation. In practice, an appropriate time synchronisation between two access network nodes will typically be below the standard requirements of 1500 ns, e.g. for the reasons that a first common transport network node will be identified within some hops, or that modern transport network nodes have less time inaccuracies. Thereby, coordination functions of further transport network nodes can be properly served. Compared with the FIG. 1 above, also wireless communication devices which are located outside the span between the dotted lines A and B could be served by the multiple access network nodes, which enable a more effective use of installed communication resources.

It is to be noted that in practice, further components may contribute to the total time synchronisation inaccuracy between the access network nodes 220, 222, such as various delays and asymmetry in communication links between the transport network nodes, or delays in transport network nodes and wander in internal clocks of transport network nodes. In order to simplify the understanding of the disclosed concept we have focused on the time inaccuracies caused by the transport network nodes. However, the disclosed concept is not limited thereto, and further delay or asymmetry contributions may be taken into account when calculating time synchronisation inaccuracy. It is further to be noted that even if the term "time synchronised" will be used in this exemplifying embodiment, other terms are sometimes used instead within literature, e.g. "phase synchronised".

Figure 2:
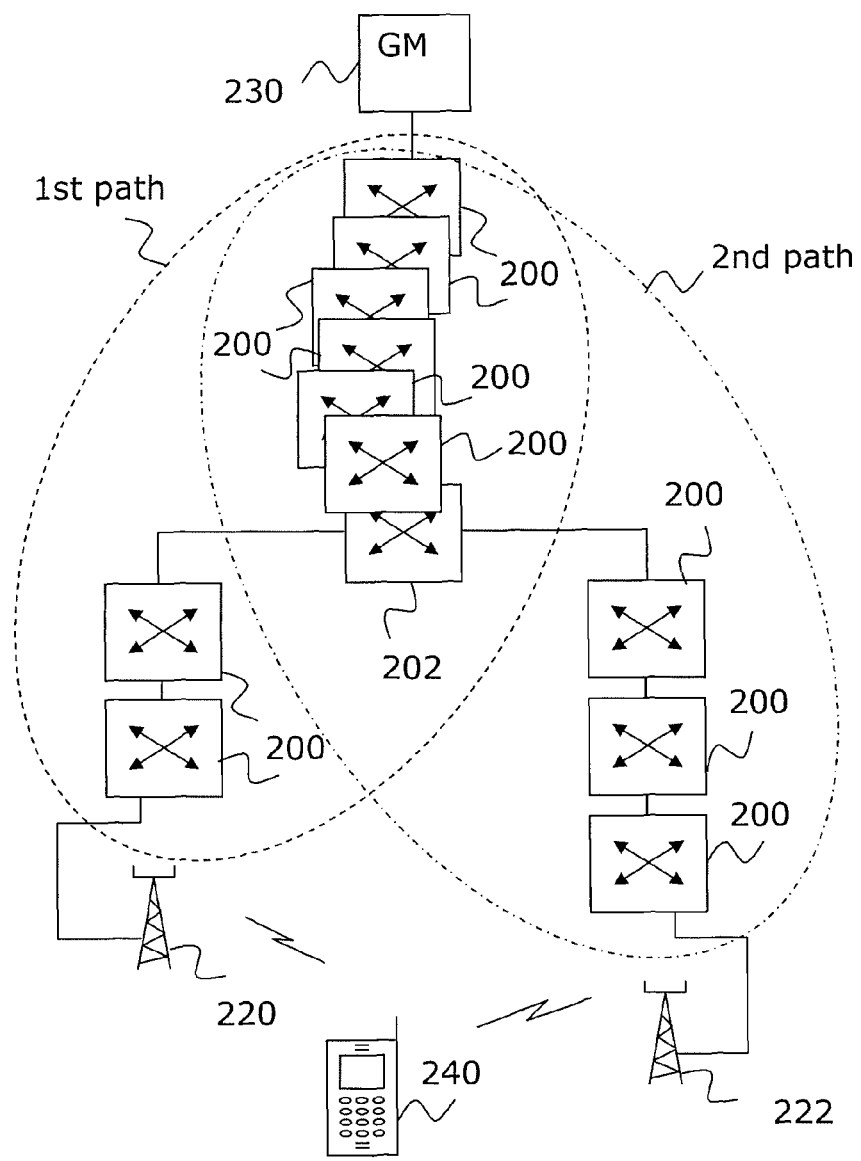
FIG. 2 is schematic block diagram of a scenario, according to possible embodiments.

With reference to FIG. 2, which is a schematic overview, a scenario in a communication network will now be described in accordance with one exemplifying embodiment.

In the communication network a wireless communication device 240 is communicatively connected to two access network nodes 220, 222 for performing a service. The disclosed concept is not limited to any specific service, and may be applied for any suitable service in a communication network where the wireless communication device is communicatively connected to multiple access network nodes.

Each of the transport network nodes 200, 202 typically give rise to a respective time inaccuracy of internal clocks of the access network nodes 220, 222.

As stated above, different services have various time synchronisation inaccuracy requirements between the internal clocks of the multiple access network nodes. For instance, the service FeICIC (Further enhanced Inter-Cell Interference Coordination) requires that the total time synchronisation error between corresponding signals reaching the wireless communication device 240 is below a specific threshold value, e.g. below 3000 ns.

Today, even if respective internal clocks of the access network nodes are synchronised in accordance with PTP, in order to ensure that a wireless communication device 240 could be properly served, the PTP requirements states that a maximum of 10 transport network nodes 200, 202 could be arranged between the grandmaster entity 230 and an access network node 220, 222.

To synchronise internal clocks of the access network nodes 220, 222 and also transport network nodes 200, 202, the grandmaster entity 230 sends PTP (Precision Time Protocol) packets towards the access network nodes 220, 222, via the transport network nodes 200, 202. The Grandmaster entity 230 sends PTP packets according to PTP IEEE (Institute of Electrical and Electronics Engineers) 1588v2, end to end, to PTP-clients, i.e. the access network nodes 220, 222.

In practice, internal clocks of two access network nodes 220, 222 who serve the wireless communication device 240 can not differ too much in order to ensure performed services of the wireless communication device 240 operate properly. As stated above, in order to estimate a total time synchronisation inaccuracy value between the two access network nodes 220, 222, an estimated number of hops, e.g. 10 hops, and respective inaccuracy times of each of the transport network nodes 200, 202 and the access network nodes 220, 222 are allowed.

However, when put into practise, the access network nodes 220, 222, are typically connected via one or more common transport network nodes 202 which are located before the grandmaster entity 230. Today, the access network nodes 220, 222, are not aware whether or not they are connected via any common transport network nodes 202. Instead, one of the access network nodes 220, 222 determines whether or not a wireless communication device could be properly served based on a time synchronisation requirements according to PTP. For instances the access network node 220, 222 determines that the wireless communication device 240 is located within a pre-defined area based on the standard inaccuracy according to PTP and centred between two radio bases stations and could receive corresponding signals from the two radio base stations.

In this embodiment the first access node 220 is connected to a first common transport network node 202 via 2 intermediate access network nodes 200 and the second access network node 222 is connected to the first common transport network node 202 via 3 intermediate access network nodes 200. The relative time inaccuracy, between first access network node 220 and the second access network node 222 will then be determined as follows. It is to be noted that with the term "relative time inaccuracy" is mentioned the inaccuracy in time difference between the internal clocks of the first access network node 220 and the second access network node 222.

In this embodiment each transport network node 200, 202 which the PTP packets passes on their way from the grandmaster entity 230 to an access network node 220, 222 includes their respective Node ID to the received PTP packets. In addition the transport network nodes 200, 202 may additionally set a first message type value in a data field of the PTP packet to indicate that a Node ID is included in the PTP packets. For instance, the Node ID could be included in any of the positions 4-7, or E-F of the PTP packets, which currently are not used. In addition any suitable positions of the PTP packet header could be applied to inform the access network node 220, 222, in which position of the PTP packet Node IDs are included.

The table below describes current use of the data fields of PTP packets.

| Message type | Message class | Value (hex) |
| --- | --- | --- |
| Sync | Event | 0 |
| Delay_Req | Event | 1 |
| Pdelay_Req | Event | 2 |
| Pdelay_Resp | Event | 3 |
| Reserved | — | 4-7 |
| Follow_Up | General | 8 |
| Delay_Resp | General | 9 |
| Pdelay_Resp_Follow_Up | General | A |
| Announce | General | B |
| Signaling | General | C |
| Management | General | D |
| Reserved | — | E-F |

One of the access network nodes 220, 222 is decided to be a master access node 220 and the other access network node 222 is decided to be a slave access node 222 for a specific co-ordination function. The master access network node 220 which will determine a relative time inaccuracy between itself and the slave access network node 222, and receives PTP packets from the grandmaster entity 230 which have Node IDs of intermediate transport network nodes 200, 202 included, i.e. Node IDs of a first path. Further, the master access network node 220 obtains Node IDs from the slave access node 222, which has received corresponding PTP packets comprising included Node IDs of a corresponding second path. The master access network node 220,222 compares the received Node IDs with the obtained Node IDs and determines a first common transport network node 202.

The master access network node 220 analyses the received PTP packets and the obtained PTP packets and determines then that there are 2 intermediate transport network nodes 200 between the master access network node 220 and the first common transport network node 202, and that there are 3 intermediate transport network nodes 200 between the slave access network node 222 and the first common transport network node 202.

The master access network node 220 calculate a relative time synchronisation inaccuracy value as the accumulated time inaccuracy value of the 2 intermediate transport network nodes 200 of the first path and the 3 intermediate transport network nodes 200 of the second path, i.e. the master access network node 220 adds the respective time inaccuracy values of 5 transport network nodes.

The above described example calculation is based on that all intermediate transport network nodes of one path are affected by a positive time inaccuracy value and that all intermediate transport network nodes of the other path are affected by a negative time inaccuracy value, which is a worst case scenario. However, in practice the time inaccuracy values within each path vary and may in some extent compensate each other. Therefore, a more appropriate result may be achieved for the relative time synchronisation inaccuracy value, by performing the calculation in accordance with a statistic model of the respective time inaccuracy values.

In an alternative exemplifying embodiment, which is related to the above described one, the relative time synchronisation inaccuracy value is instead calculated by subtracting the respective time inaccuracy values of non-common transport network nodes of one path from respective time inaccuracy values of non-common transport network nodes of another path. For the example of FIG. 2, the master access node 220 calculates the relative time synchronisation inaccuracy value for 3−2=1 transport network nodes. It is to be noted that the disclosed concept is not limited to applying a specific formula for the calculation of the relative time synchronisation inaccuracy value, and that any suitable formula may be applied when appropriate. For instance, a statistical tolerance stacking algorithm may be applied.

Thus, by taking the relative time synchronisation inaccuracy value between the access network nodes 220, 222 in account, when planning which wireless communication devices 240 which could be served by two access network node, instead of the accumulated time synchronisation along the first and second paths, increases the number of wireless communication devices 240 which could be served.

In the above described embodiments, a pre-set standard value of time inaccuracy value is used to determine the relative time synchronisation inaccuracy value. However, in practice the time synchronisation inaccuracy values vary between different transport network nodes, e.g. due to different vendors or different releases.

In another exemplifying embodiment, which is based on any of the above described embodiments, the transport network nodes 200, 202 in addition are equipped with functionality to include their respective time inaccuracy values in the received PTP packets before forwarding them towards the access network nodes 220, 222. Thereby the master access network node 220 will be enabled to apply the appropriate time inaccuracy values instead of the pre-set standard time inaccuracy values, which may make the calculation of the relative time synchronisation inaccuracy values further more accurate. Because the time inaccuracy values are lower or equal to the standard time inaccuracy values, the relative time synchronisation inaccuracy value will be further decreased. Thus, by in addition base the calculation of the relative time synchronisation inaccuracy value on the appropriate time inaccuracy values of the transport network nodes 200, 202, further reduction of the relative time synchronisation inaccuracy value may be achieved.

Furthermore, in packet switched communication networks, the transport network is dynamic, i.e. the transport network nodes that are used vary over time. For instance, even if a transport network node 200 which is determined to be the first transport network node 202 at a time, another transport network node 200 may be the first transport network node 202 at another time.

In another exemplifying embodiment, which is based one above described embodiment, the master access network node 220 is then adapted to dynamically determine which transport network node 200 that currently is the first common transport network node 202 and perform the calculation of the relative time synchronisation inaccuracy value based on the current first transport network node 202.

It is to be noted that even if the above described exemplifying embodiments are disclosed for a wireless communication device which is communicatively connected to two access network nodes 220, 222, the concept is not limited thereto. The above described concept could be modified to be applied to any suitable number of access network nodes.

In the above described scenario, transport network nodes distribute PTP data to access network nodes, such as eNodeBs. In conjunction with some following exemplifying embodiment and the schematic FIGS. 3 and 4, some methods performed by transport network nodes and access network nodes will now be described.

Figure 3:
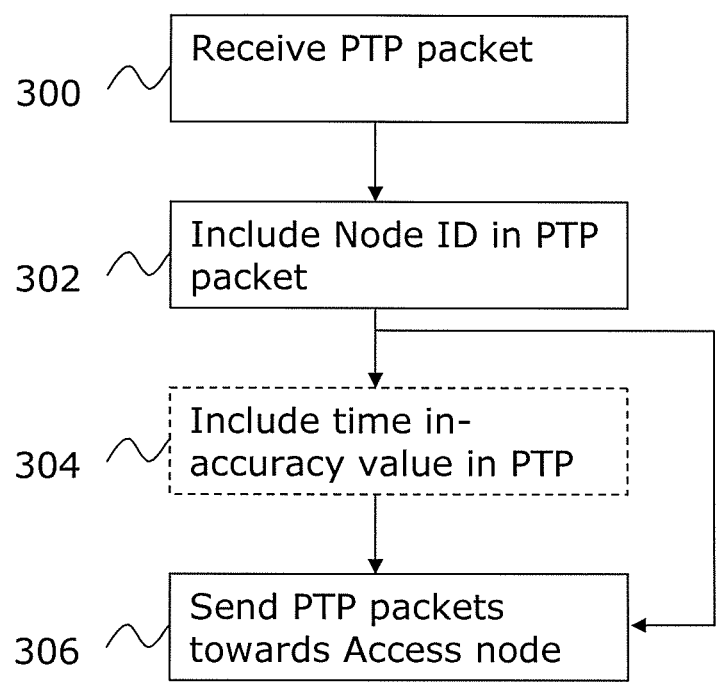
FIG. 3 is a schematic flow chart of a method, according to possible embodiments.

FIG. 3 illustrate schematically a method performed by a transport network node, such as any of the routers or switches 200, 202 of FIG. 2.

A grandmaster entity is arranged which sends PTP packets towards access network nodes. The PTP packets are distributed via a plurality of transport network nodes.

In a first action 300, the transport network node receives PTP packets from the Grandmaster entity. The PTP packets may be received via another transport network node or directly from the Grandmaster entity. In the case when the PTP packets are received from another transport network node, they have already got a Node ID of that transport network node included in the PTP packets. As described above in conjunction with another embodiment, the Node ID may be included in some appropriate of the reserved data fields of the PTP packets. In addition, some appropriate ones of the reserved data fields in the PTP packet headers of payload may be provided with information that Node IDs are included.

In a following action 302, the transport network node includes its own Node ID in the received PTP packets both for boundary clock and for transparent clock, before forwarding the received PTP packets to the access network node in a subsequent action 306. The transport network node is, however, not limited to send the PTP packets directly to the access network nodes. Instead the PTP packets may be forwarded via an appropriate number of transport network nodes which include their own Node IDs.

The access network nodes will then receive the Node IDs via which the PTP packets are distributed and may make use of the Node IDs to determine a relative time synchronisation inaccuracy value, which will be described below in conjunction with another exemplifying embodiment.

In a related exemplifying embodiment, which is based on the one described above, the transport network node in addition includes information regarding their own time inaccuracy value, in an optional action 304 performed between the actions 302 and 306. As stated above, this information may relate to varying generations and requirements of the transport network nodes and may be pre-set in the transport network nodes by vendors of the transport network nodes.

A wireless communication device will be served by multiple access network nodes for co-ordination functions, such as FeICIC. One of the multiple access network nodes is set as a master access node which cooperates with one or more slave access nodes. In practice, any of the multiple access network nodes may be set as master access node for a co-ordination function. The following exemplifying embodiment will be described for an access network node which is set to act as master access node. However, the access network which this embodiment is described for could alternatively instead have been set to act as slave access node and cooperate with another master access node within the concept. It is also to be noted that one access network node may be set to act as a master access network node for one wireless communication device and co-ordination function, but as a slave access network node for another wireless communication device using the same co-ordination function within the disclosed concept.

Figure 4:
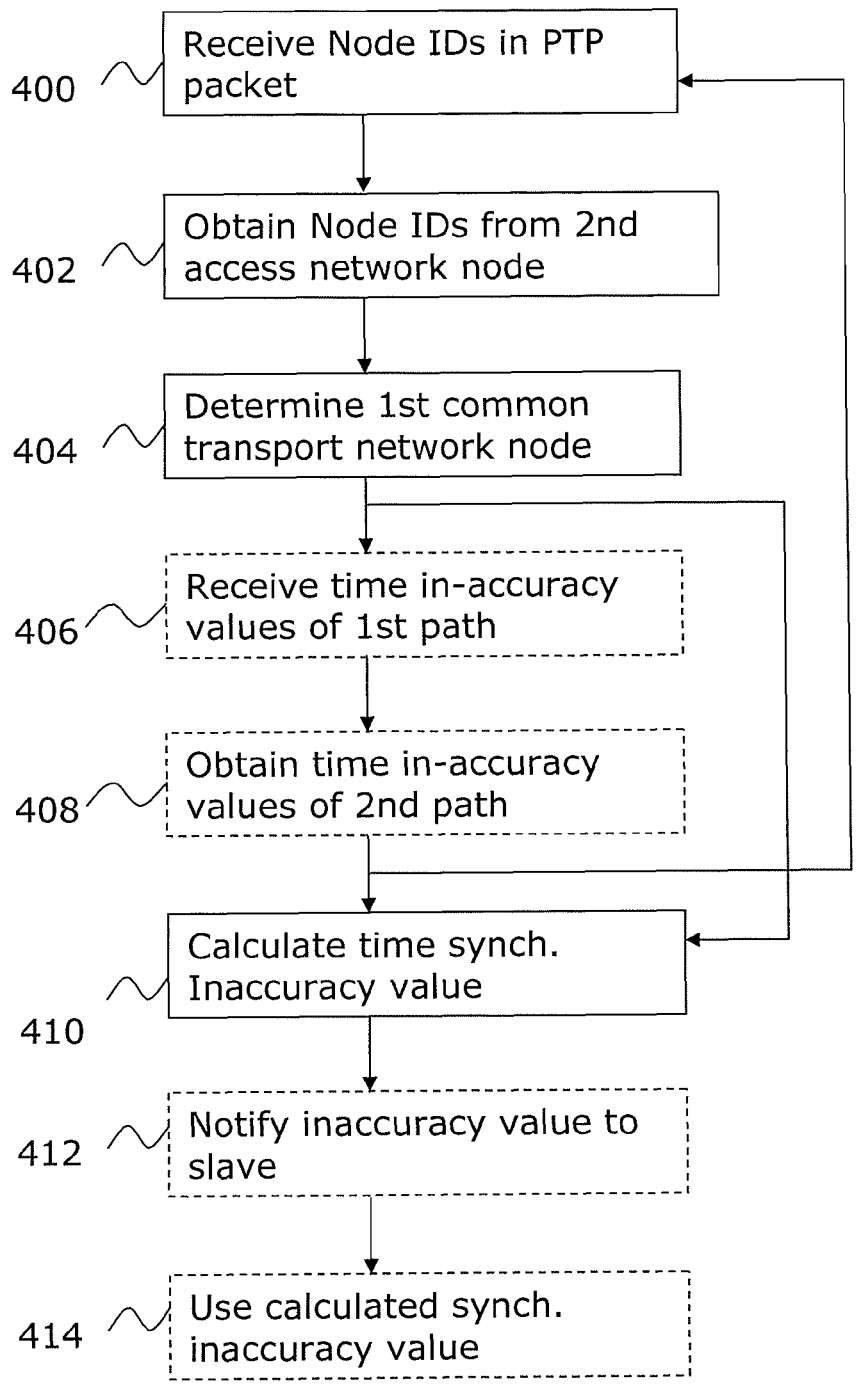
FIG. 4 is a schematic flow chart of a method, according to possible embodiments.

With reference to FIG. 4, which is a schematic flow chart, a method performed by a master access network node of determining a relative time synchronisation inaccuracy value between the master access network node and a slave access network node will now be described in accordance with one exemplifying embodiment. Regarding this embodiment and others of this disclosure, we emphasize that the term "relative" will be used to denote that the determined time synchronisation inaccuracy value is defined between two or more access network nodes. It is to be pointed out that the term "relative" doesn't mean that time precision of any of the internal clocks of the communication network nodes is relatively inaccurate.

In a first action 400, the access network node receives PTP packets from a Grandmaster entity via one or more transport network nodes. Each of the transport network nodes has included their respective Node IDs in the PTP packets, e.g. in any suitable reserved data field of the PTP packets.

In another action 402, the master access network node obtains Node IDs from the slave access node which the slave access node has received in a corresponding action as the above described action 400. Typically, the master access node obtains Node IDs by requesting the Node IDs from the slave access node, and receives the Node IDs in response thereto. However, the slave access node may instead be implemented to actively send received Node IDs to the master access network node without being requested, and the master access node may alternatively be implemented to passively receive these Node IDs within the disclosed concept.

In a following action 404, the master access node determines a first common transport network node. The determination is performed by comparing the Node IDs which the master access node has received from the Grandmaster entity in the action 400, with the Node IDs which the master access node has obtained in the action 402. The first common transport network node is the common transport network node via which the master access network node and the slave access network node are connected. Compared to the FIG. 2, the first common transport network node would be referred to as 202.

In a following action 410, the master access network node calculates a relative time synchronisation inaccuracy value between the master access network node and the slave access network node. The calculation is based on: the number of transport network nodes which are located between the master access network node and the first common transport network node; the number of transport network nodes which are located between the slave access network node and the first common transport network node; and respective time inaccuracy values of the respective transport network nodes connecting the master access network node and the slave access network node. The calculation may be performed according to various suitable algorithms which have been describe above in conjunction with another exemplifying embodiment and will therefore not be disclosed further herein.

In a final action 414, the calculated relative time synchronisation inaccuracy value may then be applied for determining which wireless communication devices that could be served by the master access network node and the slave access network node for an appropriate coordination function. The action 414 may further comprise to send information to the slave access network node which wireless communication devices that have been determined to be able to be served for the appropriate co-ordination function.

The above described method typically enables a master access network node to calculate a fair and appropriate relative time synchronisation inaccuracy value according to the current situation, such that an increased number of wireless communication devices could be reliably served.

However, the disclosed concept is not limited thereto. Typically, in an optional action 412 which may be performed before, after, or simultaneously as the action 414, the calculated relative time synchronisation inaccuracy value is sent to the slave access network node, to enable also the slave access network node to increase accurateness when serving the wireless communication device.

However, the above described calculation could be even more accurate by informing the master access network node of the actual time inaccuracy values of the transport network nodes.

In a related exemplifying embodiment, which is based on some of the above described ones, the transport network nodes are in addition equipped with functionality to include also their own time inaccuracy values in the PTP packets.

In an intermediate action 406, the master access network node receives time inaccuracy values of the transport network nodes which constitute a first path between the Grandmaster entity and the master access network node. Correspondingly, in another intermediate action 408, the master access network node obtains time inaccuracy values of the transport network nodes which constitute a second path between the Grandmaster entity and the slave access network node. Typically, the time inaccuracy values of action 406 and 408 are included in same PTP packets as the Node IDs and are received simultaneously therewith. By making use of the actual time inaccuracy values when calculating the relative time synchronisation inaccuracy value in the action 410, the result may be further more accurate, which could enable even further wireless communication devices to be reliably served by the multiple access network nodes. In addition, the wireless communication devices may also determine their respective geographic locations with higher accuracy.

As stated, typically, the transport network is dynamic and which transport network node which currently is the first common transport network node can vary over time. Therefore, by continuously repeating the above described actions 400-404, the master access network node may base the calculations of the action 410 on the actual situation of the transport network, which may increase accurateness further when determining which wireless communication devices which currently could be reliably served.

In the above described embodiments, the Node IDs are included in PTP packets when being distributed. However, the concept is not limited the use of PTP packets, and may be applied also for other suitable synchronisation protocols.

Figure 5:
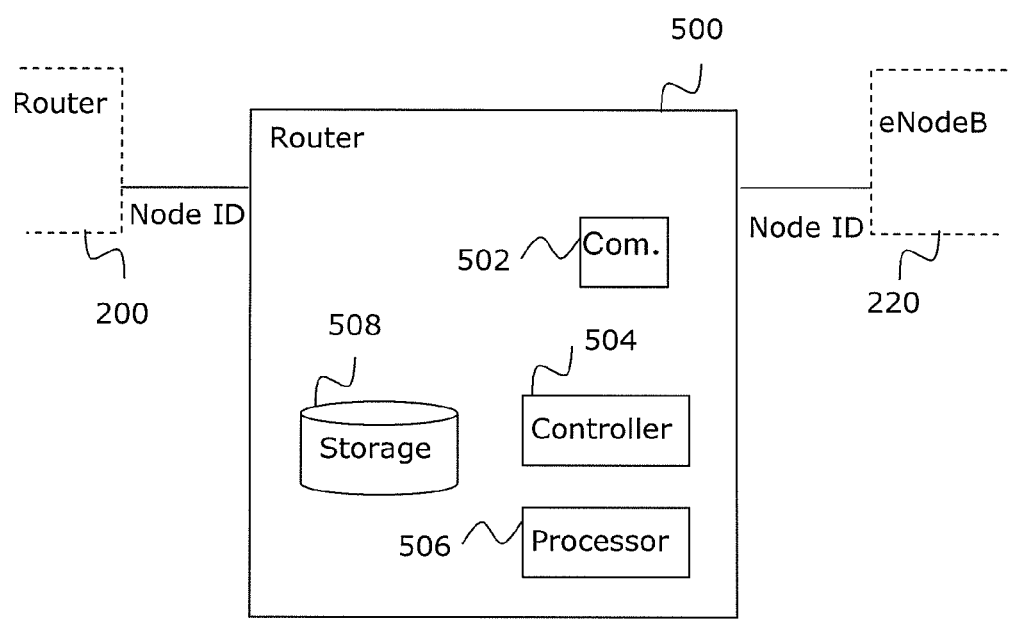
FIG. 5 is a schematic block diagram of an arrangement, according to possible embodiments.

With reference to FIG. 5, which is a schematic block diagram, a transport network node 500, will now be described in accordance with one exemplifying embodiment. This embodiment refers also to FIG. 2 for some communication network nodes, and the same reference numbers will therefore be used when appropriate.

The transport network node 500 is adapted to enable a master access network node 220, such as a radio base station, to determine a time synchronisation inaccuracy value between the master access network node 220 and a slave access network node 222.

The transport network node 500 comprises a communication module 502, a controller 504, and optionally a processor 506 and a storage module 508.

The communication module 502 is adapted to receive a PTP (Precision Time Protocol) packet from a grandmaster entity 230, either directly from the grandmaster entity 230 or via at least one further transport network nodes 200, 202.

The controller 504 is adapted to include a Node ID of the transport network node 500 in the PTP packet. The communication module 502 is further adapted to send the PTP packet with included Node ID(s) to the master access network node 220 and to the slave access node 222. The Node IDs are configured for subsequent use by the master access network node 220 for determining a time synchronisation inaccuracy between the master access network node 220 and the slave access network node 222, which will be describe below in another exemplifying embodiment.

In an alternative exemplifying embodiment, which is based on the above described one, the controller 504 may be further adapted to include a current time synchronisation inaccuracy value of the transport network node 500 in the PTP packet. The controller 504 may be further adapted to set suitable message type values in suitable data fields of the PTP packets to indicate to the access network nodes 220, 222 that Node ID(s) or current time inaccuracy value are included in the PTP packets.

Optionally, the transport network node 500 of the above described embodiments may comprise further components or units arranged to provide appropriate functionality. For instance, suitable processors 506 or storage units 508 may by arranged to provide improved calculation capacity, or storing Node IDs or time inaccuracy values, etc.

Figure 6:
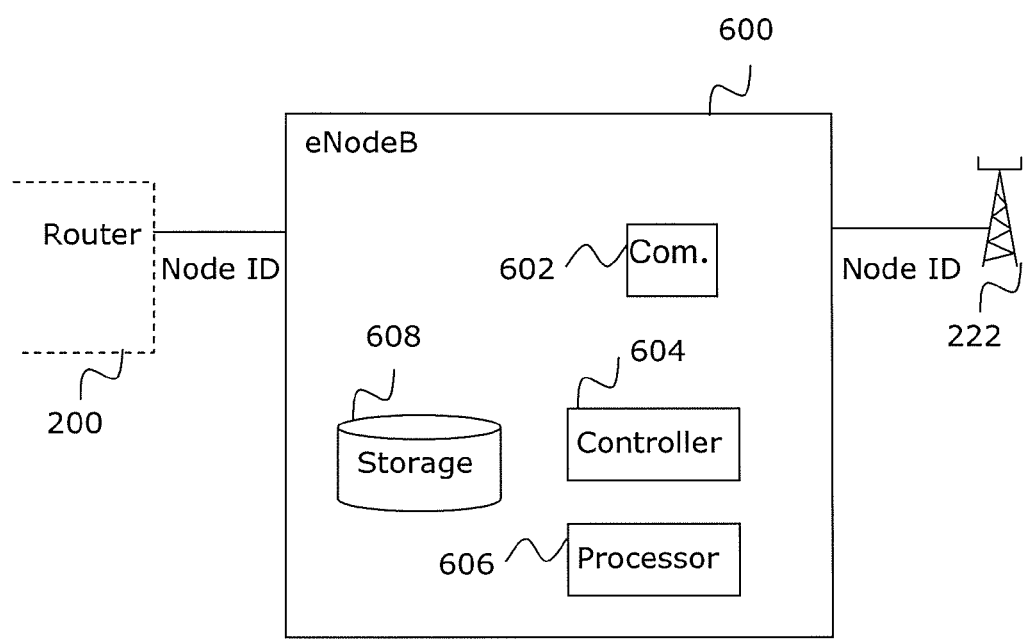
FIG. 6 is a schematic block diagram of an arrangement, according to possible embodiments.

With reference to FIG. 6, which is a schematic block diagram, a master access node 600, will now be described in accordance with one exemplifying embodiment. This embodiment refers also to FIG. 2 for some communication network nodes, and the same reference numbers will therefore be used when appropriate.

The master access network node 600 is adapted to determine a time synchronisation inaccuracy between the master access network node 600 and a slave access network node 222.

The master access network node 600 comprises a communication module 602, a controller 604, and optionally a processor 606 and a storage module 608.

The communication module 602 is adapted to receive PTP packets including Node IDs representing respective transport network nodes 200, 202 along a first path extending between a grandmaster entity 230 and the master access network node 600.

The controller 604 is adapted to obtain Node IDs from the slave access network node 222, wherein the obtained Node IDs represents respective transport network nodes 200, 202 of a second path extending between the grandmaster entity 230 and the slave access network node 222. The controller 604 is further adapted to determine a first common transport network node 202 of the first path and the second path, by comparing received Node IDs of transport network nodes 200, 202 along the first path with obtained Node IDs of transport network nodes 200, 202 along the second path. Furthermore, the controller 604 is adapted to calculate a relative time synchronisation inaccuracy value between the master access network node 600 and the slave access network node 222. The principles of the calculation have been disclosed above in another embodiment and will therefore not be further discussed herein.

In an alternative exemplifying embodiment, which is based on the above described one, the communication module 602 may be further adapted to receive time inaccuracy values of the transport network nodes of the first path included in the received PTP packets, and obtain time inaccuracy values of the transport network nodes of the second path from the slave access network node 222. Furthermore, the controller 604 may be adapted to use the received time inaccuracy values and the obtained time inaccuracy values when calculating the relative time synchronisation inaccuracy value.

Optionally, the master access network node 600 of the above described embodiments may comprise further components or units arranged to provide appropriate functionality. For instance, suitable processors 606 or storage units 608 may by arranged to provide improved calculation capacity, or storing Node IDs or time inaccuracy values, etc.

Regarding some of the above described embodiments, the arrangements, nodes, and elements are schematically described and illustrated in order to simplify the understanding. However, a designer understands that the arrangements, nodes, and elements may be alternatively implemented within the disclosed concept when put into practice. For instance, any components and modules of one of the arrangements, nodes, or elements may be arranged in another arrangement, node, or element, or that further arrangements, nodes or elements may be arranged.

Correspondingly, the method embodiments are described in a simplified manner, in order to simplify the understanding. When put into practice also the methods may comprise further actions, e.g. will various delays due to propagation be taken into account for updating internal clocks of transport network nodes and access network nodes in accordance with the PTP 1588 v2.

Figure 7:
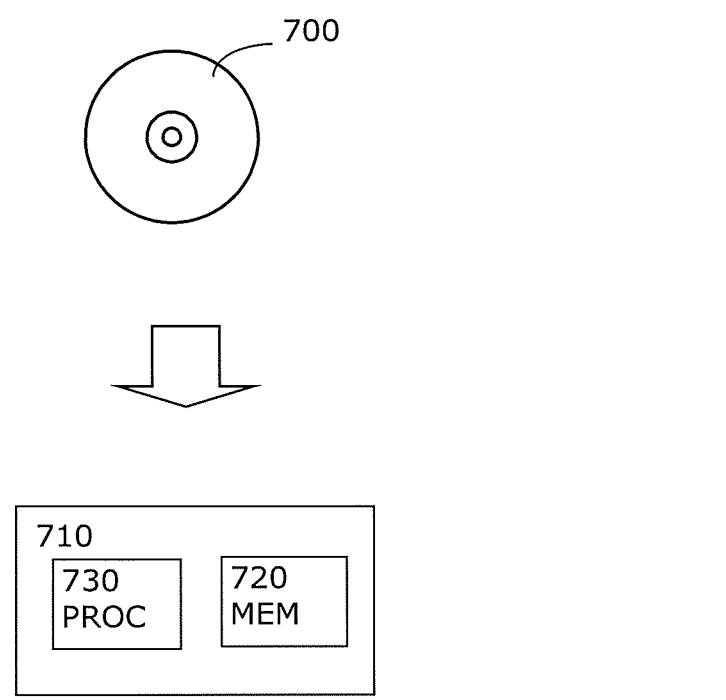
FIG. 7 is a schematic block diagram of a computer program product, according to possible embodiments.

According to some exemplifying embodiments, a computer program product comprises a computer readable medium such as, for example, a diskette or a CD-ROM as illustrated by 700 in FIG. 7. The computer readable medium may have stored thereon a computer program comprising program instructions. The computer program may be loadable into a data-processing unit 730, which may, for example, be comprised in a communication network node 710. When loaded into the data-processing unit 730, the computer program may be stored in a memory 720 associated with or integral to the data-processing unit 730. According to some embodiments, the computer program may, when loaded into and run by the data-processing unit 730, cause the data-processing unit 730 to execute method steps according to, for example, the methods shown in the FIG. 3 or 4.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed transport network node 600 and access network node 700 are also not limited to be implemented as specific physical nodes. A designer may select to implement corresponding transport network functions, and access network functions as virtual nodes in any suitable servers which are connected to the communication network, within the disclosed concept.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method performed by a transport network node, the method comprising:
    receiving a Precision Time Protocol, PTP, packet from a grandmaster entity,
    including a node identification, Node ID, of the transport network node in the PTP packet, and sending the PTP packet to an access network node,
    the Node ID being configured for subsequent use by the access network node for determining a time synchronisation inaccuracy between the access network node and a further access network node.

2. The method according to claim 1, further comprising including a current time inaccuracy value of the transport network node in the PTP packet.

3. The method according to claim 1, further comprising setting a first message type value in a first data field of the PTP packet, the first message type value indicating that the PTP packet comprises a Node ID, and wherein the Node ID of the transport network node is included in a second data field of the PTP packet.

4. The method according to claim 2, further comprising setting a second message type value in a third data field of the PTP packet, the second message type value indicating that the PTP packet comprises a current time inaccuracy value, and wherein the current time inaccuracy value of the transport network node is included in a fourth data field of the PTP packet.

5. The method according to claim 1, wherein receiving the PTP packet from the grandmaster entity is performed via a further transport network node.

6. A transport network node configured to be communicatively connectable to a first access network node and a grandmaster entity, the transport network node comprising:
    a memory;
    a processor, wherein the processor is configured to enable the transport network node to receive a Precision Time Protocol, PTP, packet from the grandmaster entity;
    a controller configured to include a node identification, Node ID, of the transport network node in the PTP packet, wherein
    the processor is further configured to enable the transport network node to send the PTP packet to the first access network node, and
    the Node ID is configured for subsequent use by the first access network node for determining a time synchronisation inaccuracy between the first access network node and a second access network node.

7. The transport network node according to claim 6, wherein the controller is further adapted to include a current time inaccuracy value of the transport network node in the PTP packet.

8. The transport network node according to claim 6, wherein the controller is further adapted to set a first message type value in a first data field of the PTP packet, the first message type value indicating that the PTP packet comprises a Node ID, and include the Node ID of the transport network node in a second data field of the PTP packet.

9. The transport network node according to claim 7, wherein the controller is further adapted to set a second message type value in a third data field of the PTP packet, the second message type value indicating that the PTP packet comprises a current time inaccuracy value, and include the current time inaccuracy value of the transport network node in a fourth data field of the PTP packet.

10. The transport network node according to claim 6, wherein the processor is adapted to receive the PTP packet from the grandmaster entity via a further transport network node.

11. A method performed by a first access network node for determining a time synchronisation inaccuracy value between the first access network node and a second access network node, the first access network node being communicatively connected to the second access network node, the method comprising:
    receiving a Precision Time Protocol, PTP, packet including node identifications, Node IDs, representing respective transport network nodes along a first path extending between a grandmaster entity and the first access network node;
    obtaining, from the second access network node, Node IDs representing respective transport network nodes along a second path extending between the grandmaster entity and the second access network node;

determining a first common transport network node of the first path and the second path by comparing received Node IDs of transport network nodes along the first path with obtained Node IDs of transport network nodes along the second path;

calculating the time synchronisation inaccuracy value between the first access network node and the second access network node based on: i) the number of transport network nodes of the first path between the first common transport network node and the first access network node and ii) the number of transport network nodes of the second path between the first common transport network node and the second access network node, wherein the calculating is further based on respective time inaccuracy values of: i) the transport network nodes of the first path between the first common transport network node and the first access network node and ii) the transport network nodes of the second path between the first common transport network node and the second access network node.

12. The method according to claim 11, wherein the time synchronisation inaccuracy value between the first access network node and the second access network node represents a relative time synchronisation inaccuracy between the first access network node and the second access network node.

13. The method according to claim 11, wherein calculating the time synchronisation inaccuracy value between the first access network node and the second access network node comprises: adding the time inaccuracy values of transport network nodes of the first path between the first common transport network node and the first access network node to the time inaccuracy values of transport network nodes of the second path between the first common transport network node and the second access network node.

14. The method according to claim 11, wherein calculating the time synchronisation inaccuracy value between the first access network node and the second access network node comprises: subtracting the time inaccuracy values of transport network nodes of the first path between the first common transport network node and the first access network node from the time inaccuracy values of transport network nodes of the second path between the first common transport network node and the second access network node.

15. The method according to claim 11, wherein calculating the time synchronisation inaccuracy value between the first access network node and the second access network node comprises: statistical tolerance stacking of the time inaccuracy values of transport network nodes of the first path between the first common transport network node and the first access network node and of the time inaccuracy values of transport network nodes of the second path between the first common transport network node and the second access network node.

16. The method according to claim 11, wherein one or more pre-set standard time inaccuracy values are used as the respective time inaccuracy values when calculating the time synchronisation inaccuracy value between the first access network node and the second access network node.

17. The method according to claim 11, further comprising receiving respective time inaccuracy values of transport network nodes of the first path, and obtaining respective time inaccuracy values of transport network nodes of the second path, and use at least a subset of the received respective time inaccuracy values and the obtained respective time inaccuracy values, when calculating the time synchronisation inaccuracy value between the first access network node and the second access network node.

18. The method according to claim 11, wherein the Node IDs representing respective transport network nodes of the first path are received in a first data field of the PTP packet.

19. The method according to claim 11, further comprising repeating the actions of: receiving PTP packets including Node IDs representing respective transport network nodes of the first path; obtaining Node IDs representing transport network nodes along the second path; determining the first common transport network node of the first path and the second path; and calculating the time synchronisation inaccuracy value between the first access network node and the second access network node.

20. A first access network node configured to determine a time synchronisation inaccuracy value between the first access network node and a second access network node, the first access network node being communicatively connected to the second access network node, the first access network node comprising:
a memory;
a processor, wherein the processor is configured to enable the first access network node to
receive a Precision Time Protocol, PTP, packet including node identifications, Node IDs, representing respective transport network nodes along a first path extending between a grandmaster entity and the first access network node; and
a controller configured to:
obtain from a second access network node, Node IDs representing respective transport network nodes along a second path extending between a grandmaster entity and the second access network node,
determine a first common transport network node of the first path and the second path, by comparing received Node IDs of transport network nodes along the first path with obtained Node IDs of transport network nodes along the second path, and
calculate the time synchronisation inaccuracy value between the first access network node and the second access network node, based on: i) the number of transport network nodes of the first path between the first common transport network node and the first access network node, ii) the number of transport network nodes of the second path between the first common transport network node and the second access network node, and iii) respective time inaccuracy values of: i) the transport network nodes of the first path between the first common transport network node and the first access network node and ii) the transport network nodes of the second path between the first common transport network node and the second access network node.

21. The first access network node according to claim 20, wherein the calculated time synchronisation inaccuracy value represents the relative time synchronisation inaccuracy between the first access network node and the second access network node.

22. The first access network node according to claim 20, wherein the controller is adapted to calculate the time synchronisation inaccuracy value between the first access network node and the second access network node based on a sum of: the time inaccuracy values of transport network nodes of the first path between the first common transport network node and the first access network node; and the time inaccuracy values of transport network nodes of the second path between the first common transport network node and the second access network node.

23. The first access network node according to claim 20, wherein the controller is adapted to calculate the time synchronisation inaccuracy value between the first access network node and the second access network node based on a difference between: the time inaccuracy values of transport network nodes of the first path between the first common transport network node and the first access network node; and the time inaccuracy values of transport network nodes of the second path between the first common transport network node and the second access network node.

24. The first access network node according to claim 20, wherein the controller is adapted to calculate the time synchronisation inaccuracy value between the first access network node and the second access network node based on a statistical tolerance stacking of: the time inaccuracy values of transport network nodes of the first path between the first common transport network node and the first access network node; and the time inaccuracy values of transport network nodes of the second path between the first common transport network node and the second access network node.

25. The first access network node according claim 20, wherein the controller is adapted to use on one or more pre-set standard time inaccuracy values as the respective time inaccuracy values when calculating the time synchronisation inaccuracy value between the first access network node and the second access network node.

26. The first access network node according to claim 20, wherein the processor is adapted to receive respective time synchronisation inaccuracy values of transport network nodes along the first path, the controller is adapted to obtain respective time synchronisation inaccuracy values of transport network nodes along the second path, and the controller is further adapted to use at least a subset of the received respective time inaccuracy values and the obtained respective time inaccuracy values, when calculating the time synchronisation inaccuracy value between the first access network node and the second access network node.

27. The first access network node according to claim 20, wherein the processor is adapted to receive the Node IDs representing respective transport network nodes along the first path in a first data field of the PTP packet.

28. The first access network node according to claim 20, wherein the communication module is adapted to repeat the action of receiving PTP packets including Node IDs representing respective transport network nodes along a first path; the controller is adapted to repeat the actions of: obtaining Node IDs representing transport network nodes along a second path; determining the first common transport network node of the first path and the second path; and calculating the time synchronisation inaccuracy value between the first access network node and the second access network node.

29. A non-transitory computer program product comprising a computer readable medium, having thereon a computer program comprising program instructions, which, when executed by a processor, causes the processor to execute the method according to claim 1.

* * * * *